Nov. 8, 1938.  W. S. FREDENHAGEN ET AL  2,136,355

DRINK MIXING APPARATUS

Filed Jan. 3, 1938

Inventors—
Walter S. Fredenhagen, and
Mark S. Schmidt,
By: Fricke & DeBuck, Atty's.

Patented Nov. 8, 1938

2,136,355

UNITED STATES PATENT OFFICE 2,136,355

DRINK MIXING APPARATUS

Walter S. Fredenhagen and Mark S. Schmidt, Naperville, Ill.

Application January 3, 1938, Serial No. 182,989

1 Claim. (Cl. 229—4.5)

Our invention relates to drink mixing apparatus of the type adapted for mixing a single drink at a time, such as are used extensively at soda fountains, one well-known form of which comprises an electric motor mounted in elevated position on a stand and having its shaft in substantially vertical position with a mixing device on its lower end so as to enable a container with the materials to be mixed therein to be moved upwardly about the shaft and mixing device. It is the object of our invention to provide an improved form and arrangement of parts in an apparatus of this type whereby mixing may be effected to better advantage so as to prepare a drink of comparatively heavy consistency by the use of a minimum amount of ice-cream, and whereby preliminary work can be done to advantage for the preparation of a great number of individual drinks in advance of the rush hour period without the necessity for the expenditure of a large sum for equipment for the fountain.

It is one of the objects of our invention to provide an improved container comprising at least a portion thereof made of transparent or translucent material so as to enable an operator to observe the amount of liquid material in the cup and thus judge more accurately the amount of the different ingredients being added. It is another object of our invention to provide an improved form of mixing container having at least the greater portion of the container formed of heat insulating material so as to cut down to a minimum the effect of the room temperature on the contents of the container. It is another object of our invention to provide an appliance, preferably in the form of a metal sleeve, adapted to be very readily connected with and then again disconnected from a paper cup, having a novel arrangement so as to enable it to be used effectively with the paper cup as the container for the mixing operation, the sleeve to be disconnected from the cup after the mixing operation so as to permit the drink to be served to the customer in the cup without any necessity for pouring the drink from one container to another. By this arrangement we have provided that there shall be no necessity ordinarily for the operator to wash either the serving cup or the sleeve appliance, since the cup is to be discarded and the sleeve member functions merely as the means for handling the cup and for holding it properly in position on the mixer. Our improved arrangement thus makes it much more easy and convenient for the operator to use all due care with respect to sanitation since it practically eliminates the introduction of any part of the drink materials into the wash water.

It is another object of our invention to provide an improved arrangement of cooperating means on a sleeve and a cup whereby they may be readily and quickly connected together so as to have a sealed joint between them and so as to enable the cup when filled to be handled by a hold on the sleeve member, and whereby they can again be easily disconnected by the application of a moderate pressure on one member at an angle with respect to the other member.

It is another object of our invention to provide improved supporting means on the stand of the mixer for supporting our improved two-part container in operative position thereon.

It is another object of our invention to improve apparatus of this type in sundry details hereinafter pointed out. The preferred means by which we have accomplished our several objects are illustrated in the drawing and are hereinafter specifically described. That which we believe to be new and desire to cover by Letters Patent is set forth in the claim.

In the drawing,—

Figure 1:
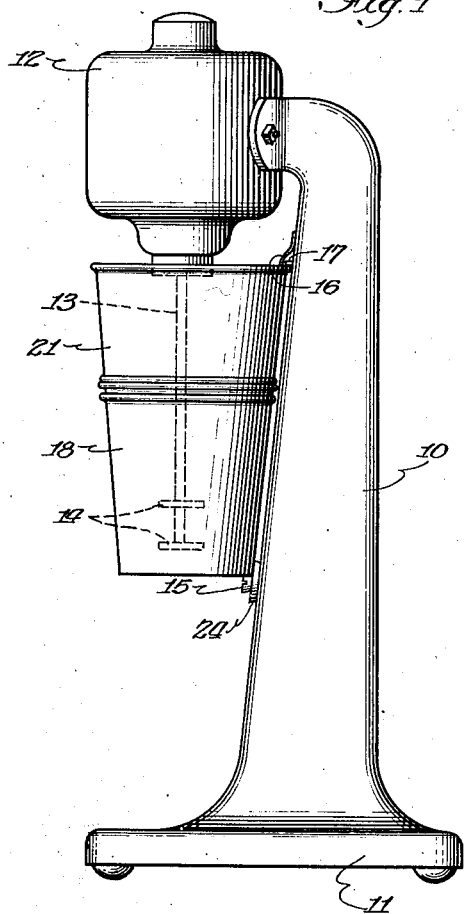
Fig. 1 is a side face view of a mixer with one of our improved two-part containers in operative position thereon.
Figure 2:
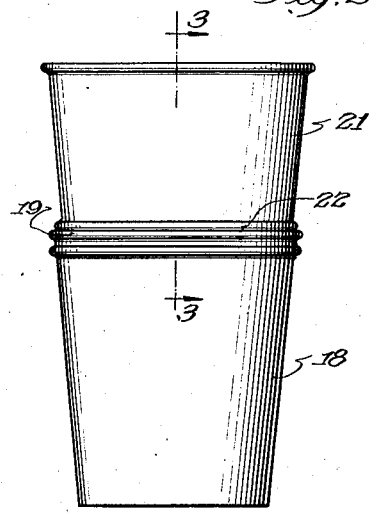
Fig. 2 is a side face view of the preferred form of container.
Figure 4:
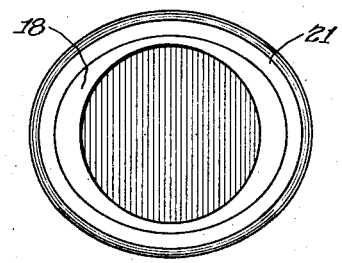
Fig. 4 is a top plan view of our improved container.
Figure 3:
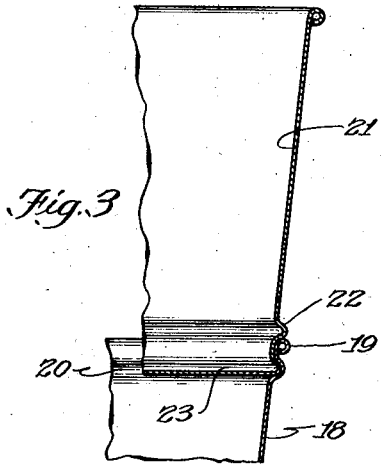
Fig. 3 is an enlarged detail view of a fragmentary portion of our container, being substantially a vertical section taken at line 3—3 of Fig. 2.
Figure 5:
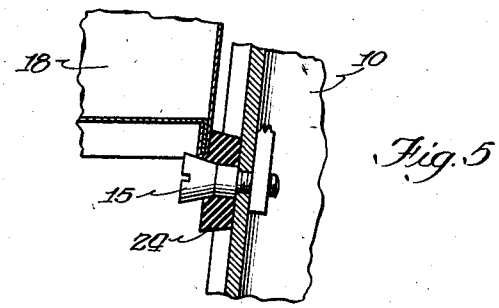
Fig. 5 is a vertical sectional view through fragmentary portions of the mixer and the container and showing the supporting means on the mixer for the container.

Referring now to the several figures of the drawing, in which corresponding parts are indicated by the same reference characters, 10 indicates a standard mounted upon a base 11 and having an electric motor 12 mounted in position on its upper end with the motor shaft 13 in substantially vertical position in spaced relation to the standard 10, with mixing devices 14 of any approved type mounted on the lower end of the shaft. On the face of the standard 10 at which the motor 12 is mounted, there is provided a lug 15 for supporting a container for materials to be mixed, the upper edge of the container being slid underneath a clip 16 in spaced relation to the stand 10. A trigger device 17 is movably mounted in position underneath the clip 16 so as to be engaged and pressed upwardly by the upper edge of the container when it is placed in operative position on the lug 15. The parts as above referred to are preferably of the standard well-known form heretofore extensively used.

Our improved mixing container for use with the mixer comprises a paper cup 18 having a reinforcing bead 19 at its upper end and having an inwardly open groove 20 pressed in its side wall a short distance below the upper edge of the cup. As is best shown in Fig. 1, the cup 18 is of considerably smaller height than that required for cooperation with the mixer. We have accordingly provided an extension for the cup 18 in the form of a sheet metal sleeve 21 having ribs 22 and 23 pressed in its lower end portion for cooperation with the groove 20 and the bead 19 of the cup, the sleeve being of such size as to have a snug fit in the upper end of the cup. The ribs 22 and 23 are so disposed that when the sleeve is pressed downwardly into the cup the rib 23 snaps into engagement with the groove 20 of the cup and the rib 22 is brought into engagement with the bead 19 so as to limit the downward movement of the sleeve into the cup. The arrangement is such that the sleeve and cup can be very quickly and easily pressed into engagement with each other and can be again very readily disconnected from each other by the application of pressure sidewise upon one of the members with respect to the other member. We have found in the use of our arrangement that the joint between the sleeve and the cup is always strong enough to prevent accidental detachment of the cup from the sleeve when the cup is filled with materials to be mixed and is then handled through the medium of the sleeve. The joint is also close enough as to prevent the leakage of fluid therethrough when under exceptional circumstances the contents of the container are poured out.

In order that the container comprising the cup and the sleeve may be used to advantage with the mixing devices 14 in the arrangement as shown in Fig. 1, we have made the sleeve 21 slightly oval so as to hold the upper end of the cup out of its normal round condition. By reason of this slight deformation of the upper end of the cup the materials in the container are kept from rotating with the mixers 14 and effective mixing conditions are accordingly brought about.

For cooperation with our improved mixing container, we have made a change in the mixer in that we have provided a spacing block 24 preferably in the form of a ring of rubber which is mounted upon the lug 15 of the stand so as to space the lower end of the cup 18 a short distance horizontally away from the standard 10. In this way, we maintain the sides of the sleeve and cup in alignment and normally prevent the application of a pressure on the joint between the cup and sleeve such as might otherwise have a tendency to disconnect them from each other.

With our cup 18 made of paper which is a very good heat insulator, the materials in the container are protected to a very large extent against the influence of room temperature which otherwise would have a considerable tendency to warm the materials to be mixed and to melt the ice-cream forming an ingredient of the mixture. We have found in practice that by the use of a paper cup as compared with the usual metal containers heretofore in use a drink of the desired fairly thick consistency can be provided by the use of a considerably smaller amount of ice-cream. We have found also that by the use of the service cup 18 for the mixing operation so as to avoid the necessity for pouring the mixed drink from one container to another a very considerable saving is made, since it is impossible to pour a drink of the desired thick consistency from one container to another without wasting an appreciable amount of the mixture by reason of its adhering to the initial container.

By making the cups 18 non-opaque, as is usual in connection with paper cups of a good quality and by combining the cup with the sleeve extension as above described, we have provided a mixing container through the wall of which an operator can see clearly enough to judge accurately the amount of milk or other materials being poured in. By the provision of this feature, we have substantially improved the container from the standpoint of the proprietor in that the operator is prevented from pouring in greatly excessive or greatly deficient quantities of milk or other ingredients.

By reason of using the cup 18 for the mixing operation and also as the service container for the drink, such container to be discarded after use, we have avoided the necessity for effective washing of the cups and have avoided the danger of insufficient washing. With the necessity for washing the cup removed by reason of our improved arrangement of the container, we have effectually removed the most potent cause of contamination of the wash water, making it much more easy and convenient for the operator to maintain a quantity of wash water in properly heated and clean condition.

In the preparation of a drink such as a malted milk, a major portion of the time required is consumed in the measurement of the ice-cream into the container. By the provision of our improved arrangement, by which a reinforcing member in the form of a sleeve is connected with each cup in turn for the mixing operation and is then removed from the cup before service of the drink, so as to enable us to use the service cup as the effective portion of the mixing container, an operator is enabled to make extensive preparations in advance of the busy hour period by placing the ice-cream in the cups in advance. This enables the operator to do a considerable part of the mixing work before the busy period, and also cuts down very substantially the time of preparation of a drink during the busy period, serving both to expedite the service and to cut down the tendency of the drink to deteriorate by reason of excessive room temperature.

While the cup 18 has been described as being formed of paper, and the sleeve 21 as being formed of sheet metal, it is to be understood that we are not limited to the use of the particular materials named. The important feature is that the cup 18 shall be effective as above described while at the same time being of so low a cost as to enable it to be discarded to advantage after its initial use. With respect to the sleeve 21, the important point is that it shall be capable of having ready and quick connection with the cup and disconnection from the cup when desired, and that it shall provide the required reinforcement for the cup for the required handling and the required cooperation with the mixer for the mixing operation.

While we prefer to employ the form of arrangement as shown in our drawing and as above described, it is to be understood that we do not limit our invention to the form as shown except so far as the claim may be so limited, it being understood that changes might well be made in the form and arrangement without departing from our invention.

We claim:—

A mixing container for a drink mixing apparatus, comprising in combination a paper cup having an inwardly open groove pressed in its side wall at about its upper end, and a comparatively rigid reinforcing member in the form of a ring adapted to have a snug fit in said cup and having an outwardly projecting rib thereabout adapted to have snug snap engagement with the groove of said cup and having a second outwardly projecting rib thereabout adapted by engagement with the top edge of the cup to limit the downward movement of the ring with respect to the cup, said ring being flattened slightly so as to give the upper end of the cup an oval shape.

WALTER S. FREDENHAGEN.
MARK S. SCHMIDT.